Patented Nov. 4, 1930

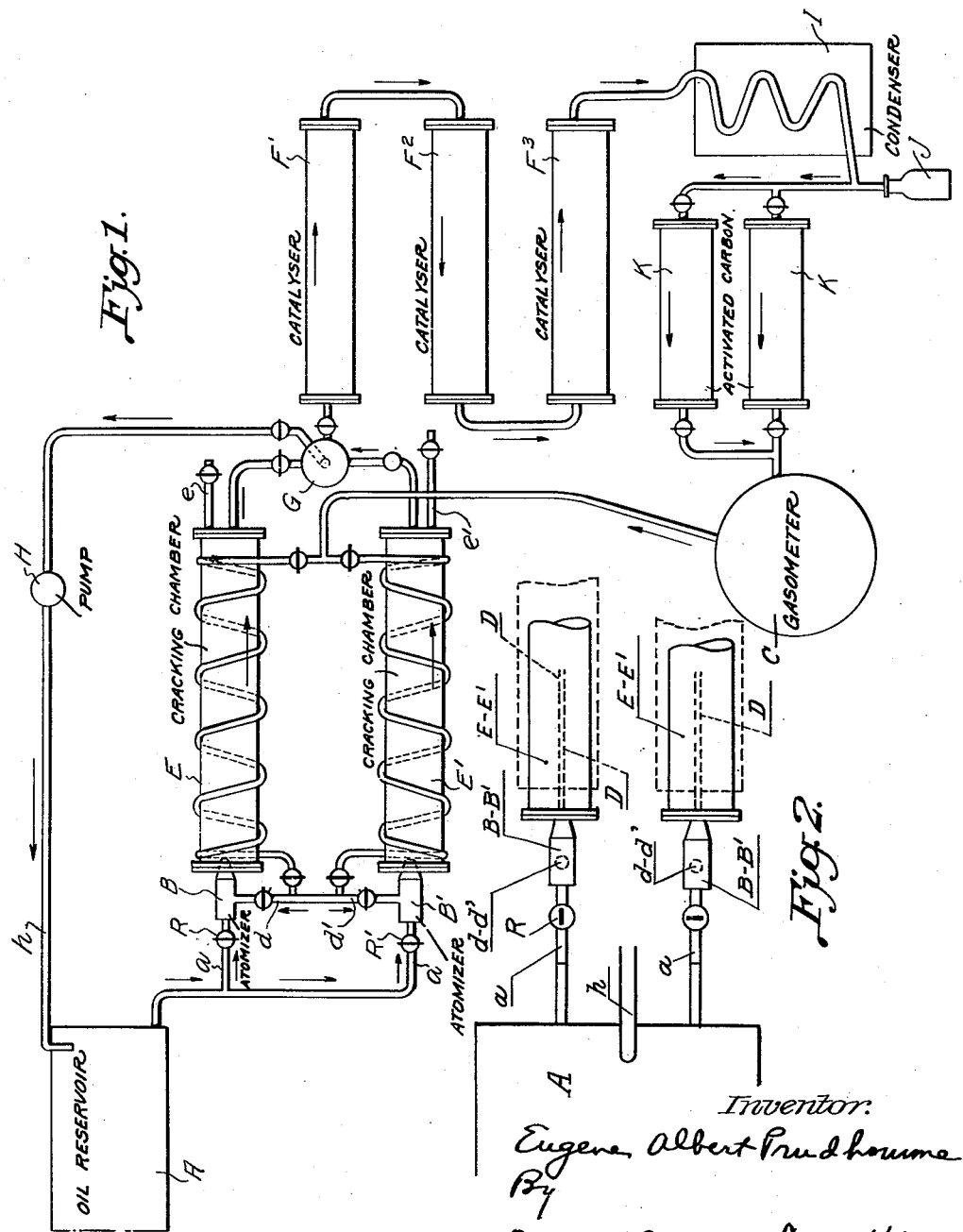

1,780,536

UNITED STATES PATENT OFFICE

EUGÈNE ALBERT PRUDHOMME, OF NEUILLY-SUR-SEINE, FRANCE, ASSIGNOR TO SOCIETE INTERNATIONALE DES PROCEDES PRUDHOMME (S. I. P. P.), OF PARIS, FRANCE, A LIMITED JOINT-STOCK COMPANY

PROCESS AND APPARATUS FOR TREATING HYDROCARBONS

Application filed June 5, 1926, Serial No. 113,983, and in France April 9, 1926.

Heavy liquid hydrocarbons are usually converted or attempted to be converted into light hydrocarbons, by heating to high temperatures, of the order of 500 to 600° C., a mass of such liquids in an autoclave, and thus effecting, in a vessel wherein very high pressures are generated, of the order of 5 to 25 atmospheres, a splitting or cracking, the vapours produced in the vessel being then conducted to the exterior to be submitted to fractional condensation, alternating in some cases with catalytic treatment for their enrichment by hydrogen and their purification.

Industrial plants for carrying out on a practical scale such known processes, present serious danger from explosion and fire. The slightest leakage from the generating apparatus of the vapours to be treated, may cause both an explosion and subsequent outbreak of fire.

In addition, in such existing plants, the decomposition of the heavy oils inevitably gives rise, simultaneously with the formation of gas under high pressure, to the separation of part of the material in the form of deposits of coke adhering to the walls of the autoclave. It follows therefrom that the efficiency of the plant is extremely defective; it progressively diminishes from the start of the operation owing to incrustations which prevent the uniform transmission of heat. Moreover, it becomes indispensable to proceed with sufficiently frequent periodical interruptions, in order to permit the removal of the coke and the reestablishment of conditions in the autoclave.

The subject of the present invention is a process for the conversion of liquid heavy hydrocarbons into light hydrocarbons, which totally suppresses the risks and defects which have just been recited.

In accordance with the invention, the liquid heavy hydrocarbons, instead of being subjected to cracking in an autoclave, are supplied to a simple reservoir giving a slight head relatively to the remainder of the plant, and are conducted, not decomposed but simply heated to a temperature of about 200° C. for instance by waste heat, to a series of atomizers of ordinary type, the entrainment of the liquid in such atomizers being effected preferably by suitably heated additional enriching gases, which may consist wholly or partly of residual gases derived from a preceding run, which enables the manufacture to be continuous.

Also in accordance with the invention, the atomized products are led directly into catalyzing and purifying apparatus, wherein occurs, simultaneously with desulphurization, cracking accompanied by the separation of coke. By arranging the purifiers and catalyzers in pairs the atomized products can be alternately received in one element of the apparatus, whilst in the other element, the elimination of the coke and sulphur, together with the regeneration of the catalyst, is being effected simply by the action of an oxidizing stream, such as a current of air.

On issuing from the catalyzer-purifiers, the mixture of vapours derived from the atomization of the heavy liquid and the entraining gases which effect the atomization, is preferably treated in a manner which will be recited in describing below a plant for carrying out the new process.

Such a plant is illustrated, by way of example, diagrammatically on the accompanying drawing, wherein Fig. 1 shows a diagrammatic elevation of the apparatus and Fig. 2 is a diagrammatic plan view of a part of Fig. 1.

The heavy oil to be treated is contained in a simple reservoir A without pressure, which may as desired be located in proximity to or at a distance from the remainder of the plant. This reservoir is located to give a slight head over one or more pairs of atomizers B, B$^1$ of known type, to which the oil coming from A is led by pipes $a$ suitably heated. The atomization is effected by the aid of gases under pressure coming from a gasometer C and suitably heated, at D, before their admission, by pipes ($d$, $d^1$) provided with cocks ($b$, $b^1$), to the said atomizers B, B$^1$. The atomizers each supply a catalyzing-purifying apparatus (E, E$^1$) charged with a metal or oxymetallic catalyst. Only one of the atomizers of each pair is operated at a time, the corresponding supply cocks R and $b$ being open, whilst the cocks $R^1$, $b^1$ of the other atomizer are closed.

In the chamber E, corresponding to the atomizer in operation, the catalyst is, in the known manner, arranged on a suitable carrier (pumice stone, fuller's earth, kieselguhr or the like). This chamber, wherein pass only vapours and gases not under pressure and corresponding to a very small fraction of the mass accumulated in the reservoir A, is heated to a temperature of 500 to 600° C. in any suitable manner as by means of residual or other gases, etc. This heating, in a separate element of the total mass to be treated, avoids the risk presented by heating the mass in bulk under pressure, for in case of leakage, the corresponding chamber E or $E^1$ can be immediately and easily isolated. The elementary cracking of the fraction of the charge which passes through chamber E in the form of vapours, is effected in said chamber and a corresponding elementary quantity of coke is deposited in the latter. Moreover, the coke formed is destined to be rapidly removed, owing to the alternate setting in operation of the two elements E and $E^1$. Permanent incrustations are therefore never produced, and the risks and reductions in efficiency resulting therefrom are suppressed.

Simultaneously with the placing out of operation of element $E^1$, the member E is placed into operation and the coke that collected in member $E^1$ during the time the latter was operated, is burned from the inner surfaces of the member $E^1$ through the action of a stream of air blown through the pipe $e$, any suitable disposal being made of the reaction products. The heat generated by such combustion can be utilized for heating the gases coming from the gasometer C which gases serve to entrain the liquids to be atomized. It would suffice to enwrap the chambers E, $E^1$ by heat absorbing coils such as D.

In these chambers therefore occurs the cracking of the elements of the liquid charge coming from A, together with the separation of the corresponding elementary quantity of coke. A purification also occurs, i. e. a partial desulphurization. The stream of air which serves to consume the coke serves at the same time to roast the sulphides formed at the expense of the metal catalysts and of the sulphur contained in the vaporized oils.

The mixture of the gases and vapours, on issuing from the chambers E, $E^1$ may still contain heavy hydrocarbons that have not been decomposed and which it is convenient to restore to the reservoir A. It is for this reason that the mixture, before being taken to the enriching and lightening catalyzers $F^1$, $F^2$, $F^3$, first traverses a dephlegmator G, maintained at a temperature below 250° C, wherein condense the products condensible above this temperature. These products are brought back in a heated state, by means of a pipe $h$, and a pump H, to the reservoir A, wherein the temperature may be maintained in the neighbourhood of 200° C. without the assistance of external heat due to the temperature of these returned products.

The products uncondensed in the dephlegmator are eventually, after traversing a purifier, conducted to an apparatus wherein catalysis in stages occur, in tubes $F^1$, $F^2$, $F^3$ interconnected in series. On issuing from the tube $F^3$, the gaseous mixture is subjected to condensation in a cooler I, and the light liquid is collected in J, the uncondensed residual products being conducted through retaining apparatus K, charged for example with active carbon which retains the light products by adsorption and the gaseous remainder finally being stored in the gasometer C.

The catalyzer employed in the chambers E, $E^1$, $F^1$, $F^2$, $F^3$ may be for example, finely divided nickel incorporated in a support such as kieselguhr, fuller's earth, or any suitable porcelanic material.

As has been stated above, the atomizers B, $B^1$ may be normally supplied exclusively by the residual gases obtained from the continuous process.

Claims:

1. A continuous process for treating heavy liquid hydrocarbons which consists in atomizing a charge of said hydrocarbons, cracking the atomized charge in a heated chamber containing a catalyst-purifier, condensing the resultant products and heating the mass of hydrocarbons to be atomized by returning the heavy fractions of said condensed products to said mass, burning the coke deposited during cracking in the said chamber, and employing the residual gases evolved in said chamber to assist in atomizing said charge, said residual gases being heated by the heat generated during the combustion of said coke.

2. A process for treating heavy liquid hydrocarbons which consists in atomizing a charge of said hydrocarbons, heating and cracking the atomized charge, condensing the resultant heavy fractions, heating the mass of hydrocarbons to be atomized by returning the condensed heavy products of said charge to said mass, burning the coke deposited during cracking, employing the heat evolved from the last named step to heat residual gases which are subsequently employed to atomize said charge, conducting the uncondensed products resulting from the cracking step through a plurality of catalyzer stages and collecting the products passed through said stages.

3. Apparatus of the class described comprising a reservoir for heavy hydrocarbons, a pair of atomizers, said reservoir being so positioned relative to the atomizers that said hydrocarbons will flow by gravity to the latter, a gasometer, means for supplying gases from said gasometer to said atomizers, catalyst chambers for receiving the mixture delivered by said atomizers, means for heating said chambers, means for selectively employing each of said atomizers and chambers, means for supplying air to each of said chambers, a dephlegmator connected to said chambers, catalyzer apparatus arranged in stages connected to said dephlegmator, a condenser connected to the last stage of said apparatus, retaining means charged with carbon or the like for receiving residual gases from said condenser, and means for conducting unretained gases to said gasometer.

4. A continuous process for treating heavy hydrocarbons which consists in atomizing a charge of said hydrocarbons, cracking the atomized charge alternately in one of a pair of heated chambers containing a catalytic purifier, condensing the resultant products and separating residual gases, heating the mass of hydrocarbons to be atomized by returning the heavy fractions of said condensed products to said mass, employing the residual gases to assist in atomizing said charge, burning the coke deposited during cracking in one chamber while carrying on the cracking in the other chamber, and employing the heat generated by combustion of said coke to heat said residual gases.

In testimony whereof I have signed this specification.

EUGÈNE ALBERT PRUDHOMME.